(12) United States Patent
Liu et al.

(10) Patent No.: US 7,234,204 B2
(45) Date of Patent: *Jun. 26, 2007

(54) PIVOTAL HINGE MECHANISM FOR MOBILE COMPUTER

(75) Inventors: Jen-Hao Liu, Taipei (TW); Jung-Sheng Chiang, Taipei (TW); Yu-Yuan Lin, Taipei (TW); Ko-Chun Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 181 days.

This patent is subject to a terminal disclaimer.

(21) Appl. No.: 10/929,437

(22) Filed: Aug. 31, 2004

(65) Prior Publication Data

US 2005/0246741 A1 Nov. 3, 2005

(30) Foreign Application Priority Data

Apr. 2, 2004 (TW) .............................. 93205059 U

(51) Int. Cl.
 *E05D 3/10* (2006.01)
(52) U.S. Cl. .......................................... 16/367; 16/374
(58) Field of Classification Search .................. 16/367, 16/374, 331, 334; 455/575.1, 575.3; 361/680–682, 361/803, 683; 248/919–923
See application file for complete search history.

(56) References Cited

U.S. PATENT DOCUMENTS

| | | | |
|---|---|---|---|
| 5,206,790 A | 4/1993 | Thomas et al. | |
| 6,105,919 A | 8/2000 | Min | |
| 6,347,433 B1 | 2/2002 | Novin et al. | |
| 6,587,333 B2 | 7/2003 | Tseng et al. | |
| 6,742,221 B2* | 6/2004 | Lu et al. | 16/367 |
| 6,845,546 B1* | 1/2005 | Lu et al. | 16/367 |
| 6,883,206 B2* | 4/2005 | Yang et al. | 16/337 |
| 7,024,729 B2* | 4/2006 | Chang et al. | 16/367 |
| 2003/0098841 A1 | 5/2003 | Broussard | |
| 2004/0008477 A1* | 1/2004 | Tseng et al. | 361/681 |
| 2004/0139578 A1 | 7/2004 | Yang et al. | |
| 2005/0060843 A1* | 3/2005 | Hung | 16/367 |
| 2005/0102799 A1* | 5/2005 | Huang | 16/367 |
| 2005/0198780 A1* | 9/2005 | Liu et al. | 16/367 |
| 2005/0251965 A1* | 11/2005 | Lu et al. | 16/367 |
| 2006/0021195 A1* | 2/2006 | Yamada et al. | 16/367 |

FOREIGN PATENT DOCUMENTS

JP 2003316474 A * 11/2003
JP 2005127449 A * 5/2005

* cited by examiner

*Primary Examiner*—Chuck Y. Mah
(74) *Attorney, Agent, or Firm*—Stevens, Davis, Miller & Mosher, LLP

(57) ABSTRACT

A pivotal hinge mechanism for a mobile computer may include a swivel seat, a support seat, and first and second pivot mounting parts. The swivel seat and the support seat cooperate to form a pivot joint that allows the swivel seat to swivel through 180 degrees with respect to the support seat. The first and second pivot mounting parts swivel about an axis that is perpendicular to the axis of the swivel seat's rotation.

20 Claims, 10 Drawing Sheets

PIVOTAL HINGE MECHANISM FOR MOBILE COMPUTER

BACKGROUND OF THE PRESENT INVENTION

1. Field of the Present Invention

The invention relates to a pivotal hinge mechanism for mobile computer and more particularly to a pivotal hinge mechanism for transforming the mobile computer from Notebook PC mode to Tablet PC mode.

2. Description of Prior Act

Today the Notebook type computer has possessed the function of allowing the Liquid Crystal Display (LCD) to rotate through an angle of 0°~180° and capably transforming the Notebook PC mode to Tablet PC mode. While the key technique to enable the Notebook type computer to possess the aforesaid function is the hinge mechanism for connecting the computer mainframe and LCD such as the technique disclosed by U.S. Pat. No. 6,587,333. This prior patent not only has the function of allowing the LCD of the Notebook PC to be kept in open or closed condition, also possesses the function of allowing the LCD to rotate through an angle of 0°~180° and transforming the computer from Notebook PC mode to Tablet PC mode and vice versa.

However, this prior conventional hinge mechanism used on Notebook PC has drawbacks of too many parts contained in the mechanism and/or too complicated procedure for installing the whole assembly that often caused decrease of precision of parts installation and deviation in relative position of parts due to accumulation of dimension tolerance of parts. Therefore, when the LCD of a Notebook PC rotates to a specific angle, the above-mentioned drawbacks will cause defects of inaccurate positioning or insecure positioning of the LCD. And, there is the necessity to make further improvement of the conventional hinge mechanism.

Besides, since the conventional hinge mechanism does not possess the function of touch sense or giving out sound signal, it has no function of assisting the user in making sure that the LCD of the Notebook PC has reached the specific angular position.

In view of this, the purpose of pivotal hinge mechanism disclosed in the invention is special for improving the structural drawbacks of the conventional hinge mechanism, and having the hinge mechanism to possess the function of touch sense or giving out sound signal.

SUMMARY OF THE PRESENT INVENTION

The major purpose of the invention is to provide a pivotal hinge mechanism for mobile computer having high assembly precision comprising a swivel seat, a support seat, a first pivot mounting part, a second pivot mounting part and a positioning plate wherein the swivel seat and the support seat form a pivot joint, and a positioning plate is employed to prevent the swivel seat and the support seat from separating from each other, and the first pivot mounting part and the second pivot mounting part are installed separately on the left and right side of the swivel seat to form two pivot joints, also the swivel seat has a first stopper shoulder which enables an angular movement range of $\theta_1$, while the support seat has a second stopper shoulder which enables an angular movement range of $\theta_2$, when the swivel seat rotates relative to the support seat, the two ends of the first stopper shoulder of the swivel seat will touch and stop the respective ends of the second stopper shoulder to enable an angular movement of the swivel seat within 0°~180° with respect to the support seat which is enabled by the total angular movement range limited by $\theta_1+\theta_2=180°$.

Another purpose of the invention is to provide a pivotal hinge mechanism for mobile computer possessing the function of touch sense, which is achieved by a touch sense unit comprising a sliding part, an elastic part and a fastening part with a matching formed on the inner surface of the support seat for receiving and mounting the swivel seat. When the swivel seat rotates on and relative to the support seat the touch sense or the sound signal produced by the touch sense unit when the sliding part slides into the groove on the support seat can help the user to make sure that the swivel seat has already reached to the specific angular position such as 0°, 45°, 90° or 180° etc.

Further purpose of the invention is to provide a pivotal hinge mechanism having touch sense function. When the swivel seat rotates on and relative to the support seat, the positioning plate of the pivotal hinge mechanism can produce touch sense or sound signal to help the user to make sure that the swivel seat has reached the specific position such as 0°, 45°, 90° or 180° etc.

BRIEF DESCRIPTION OF THE DRAWING FIGURES

Figure 5:
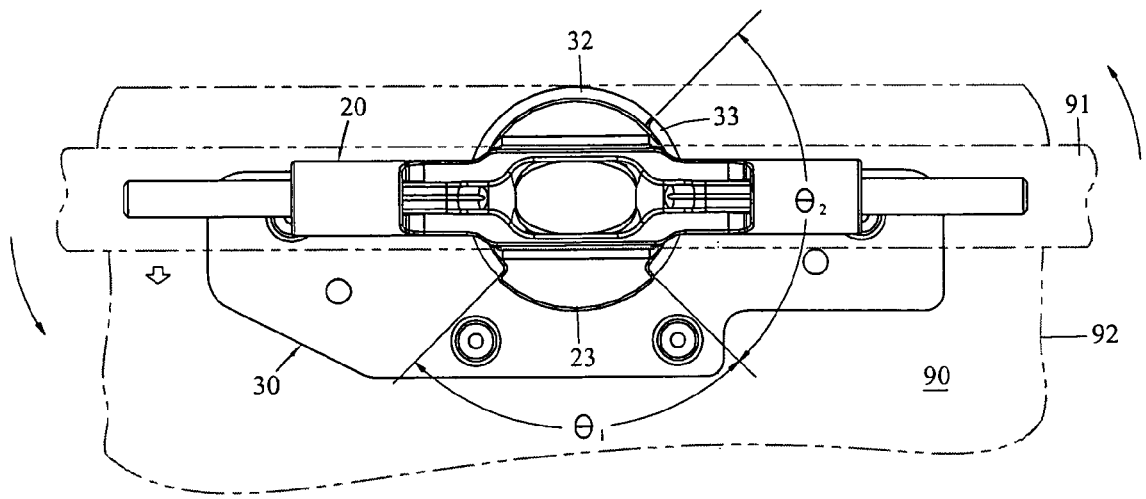
Figure 6:
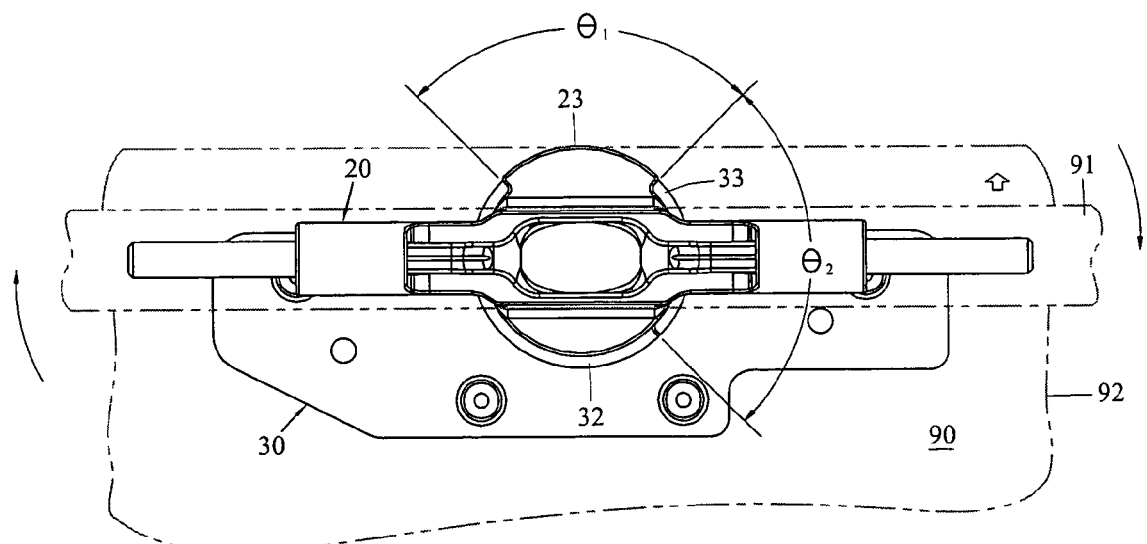
Figure 7:
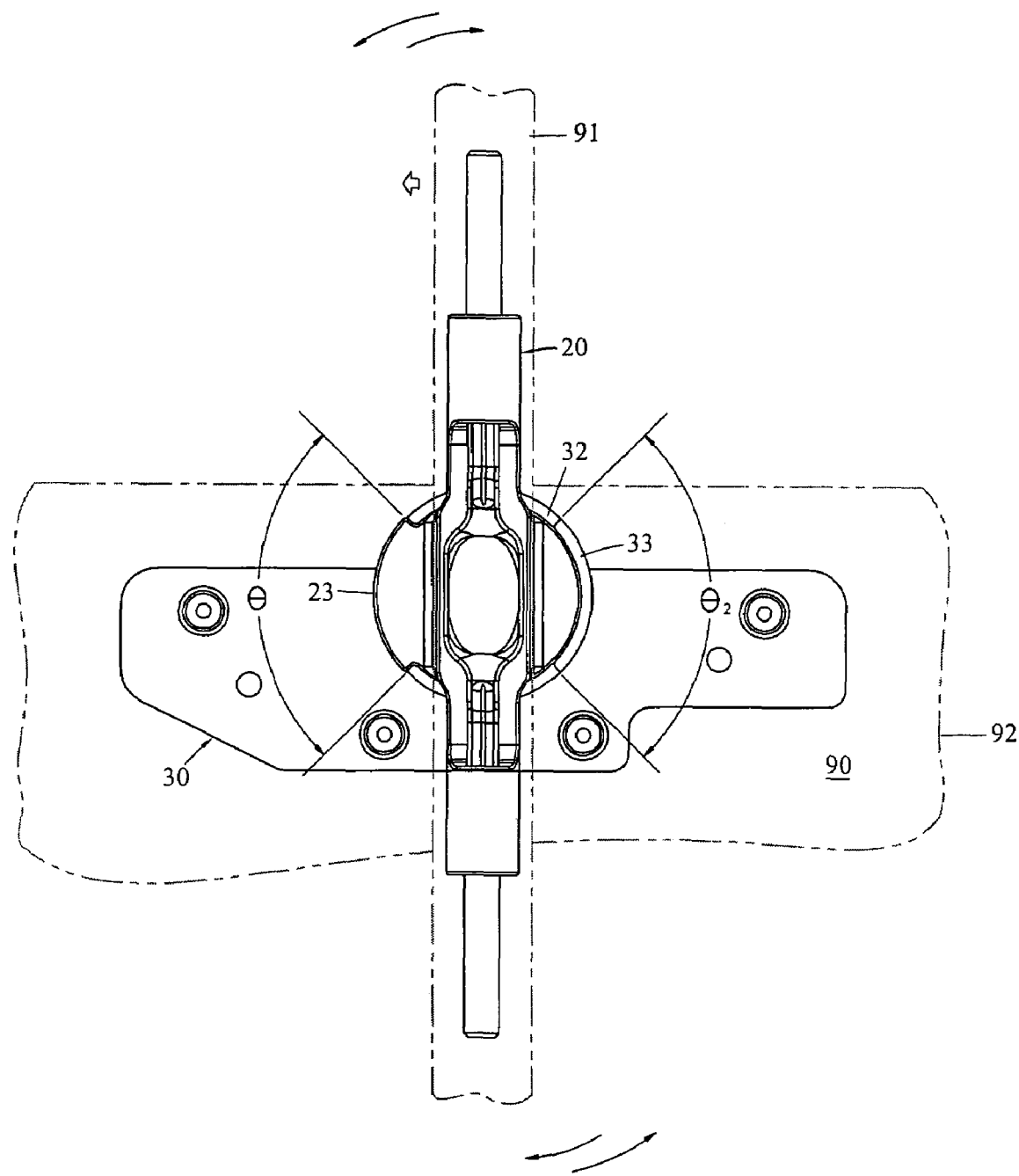

FIG. 5 through FIG. 7 are the schematic drawings showing the application of the range of angular movement $\theta_1$ of the first stopper shoulder (23) and the range of angular movement $\theta_2$ of the second stopper shoulder (33) to enable a total angle of movement of $\theta_1+\theta_2=180°$, and the function of enabling the LCD (91) of the electronic equipment to rotate relative to the computer mainframe (92) allowing the screen side of the LCD (91) (as mentioned by the arrowhead) to be located in a position within 0°~180° relative to the computer mainframe (92).

Figure 8:
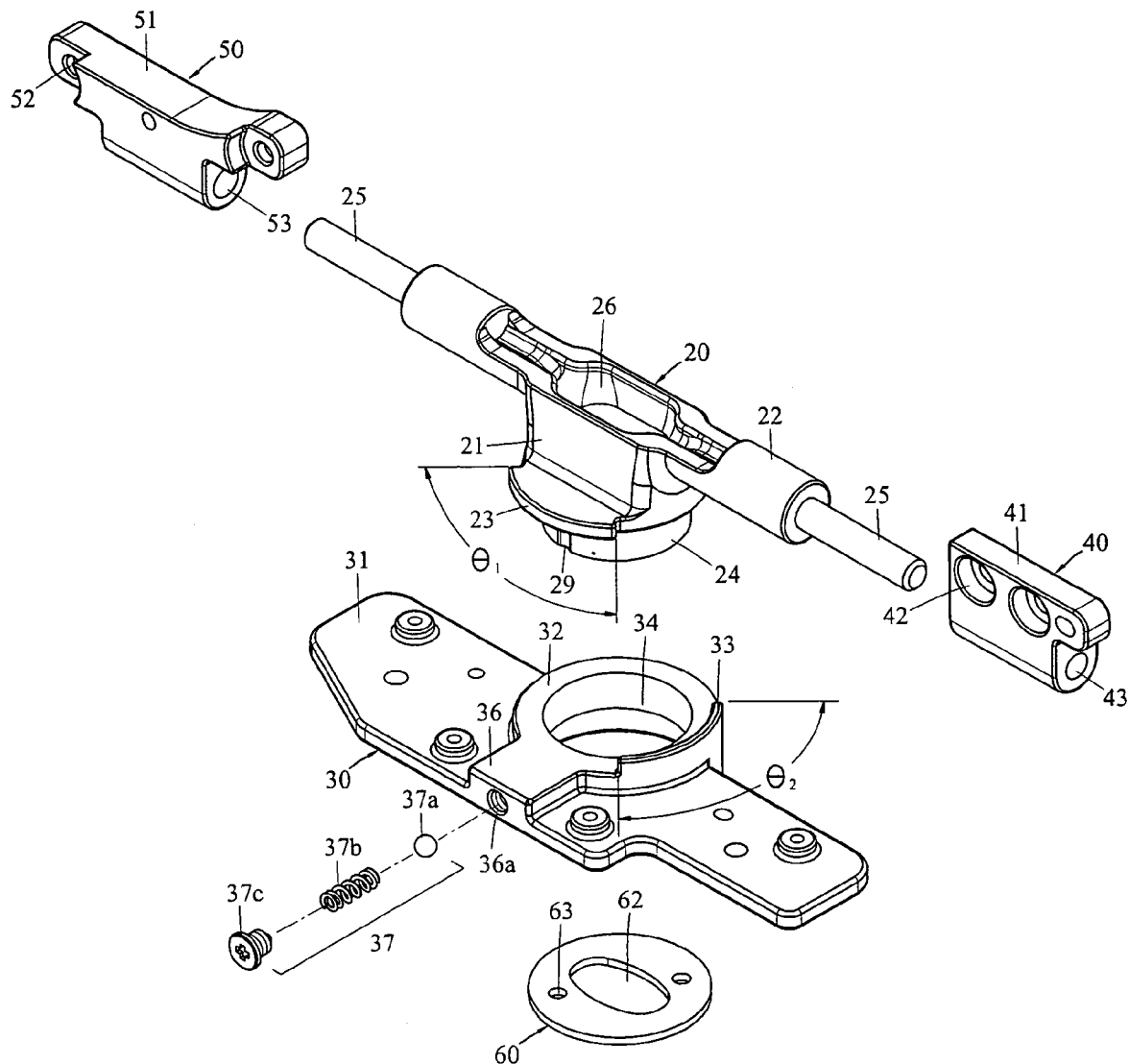

FIG. 8 is the disassembly drawing of the first example of the preferred embodiment of the pivotal hinge mechanism (10) of the invention having touch sense function.

Figure 9:
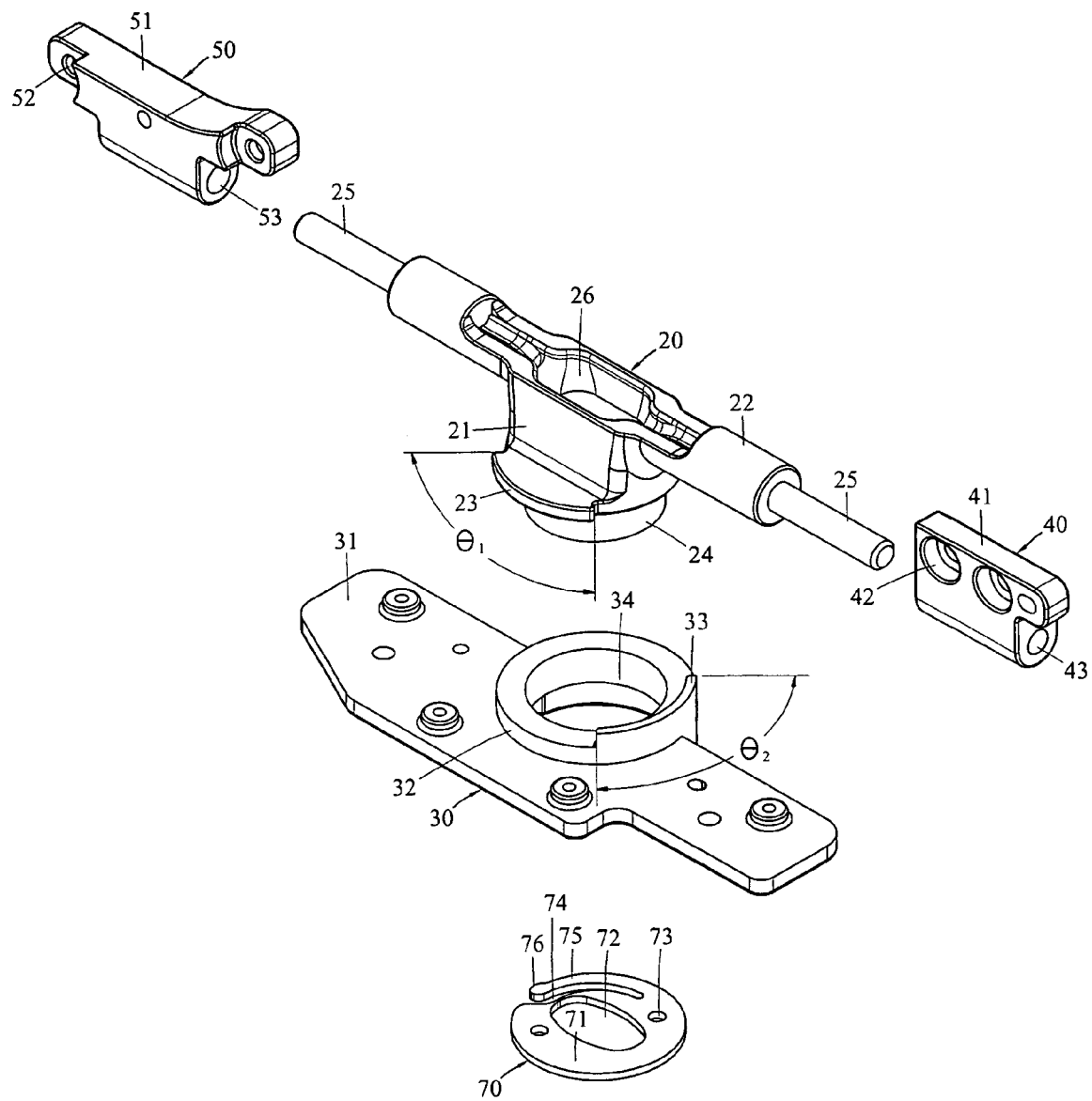

FIG. 9 is the disassembly drawing of the second example of the preferred embodiment of the pivotal hinge mechanism (10) of the invention having touch sense function.

Figure 10:
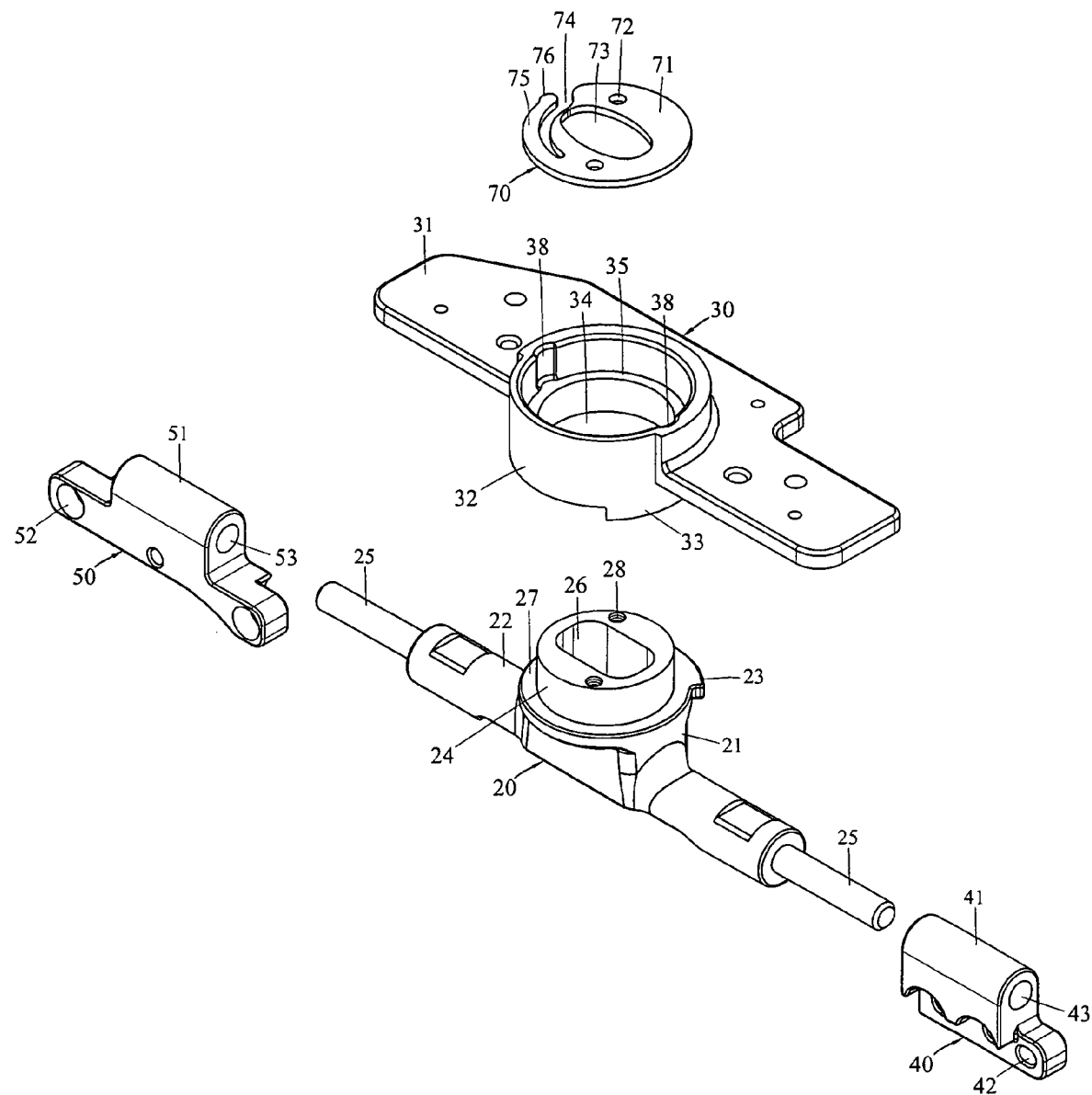

FIG. 10 is the disassembly drawing of the pivotal hinge mechanism (10) shown in FIG. 9 under different angle of view.

Figure 11:
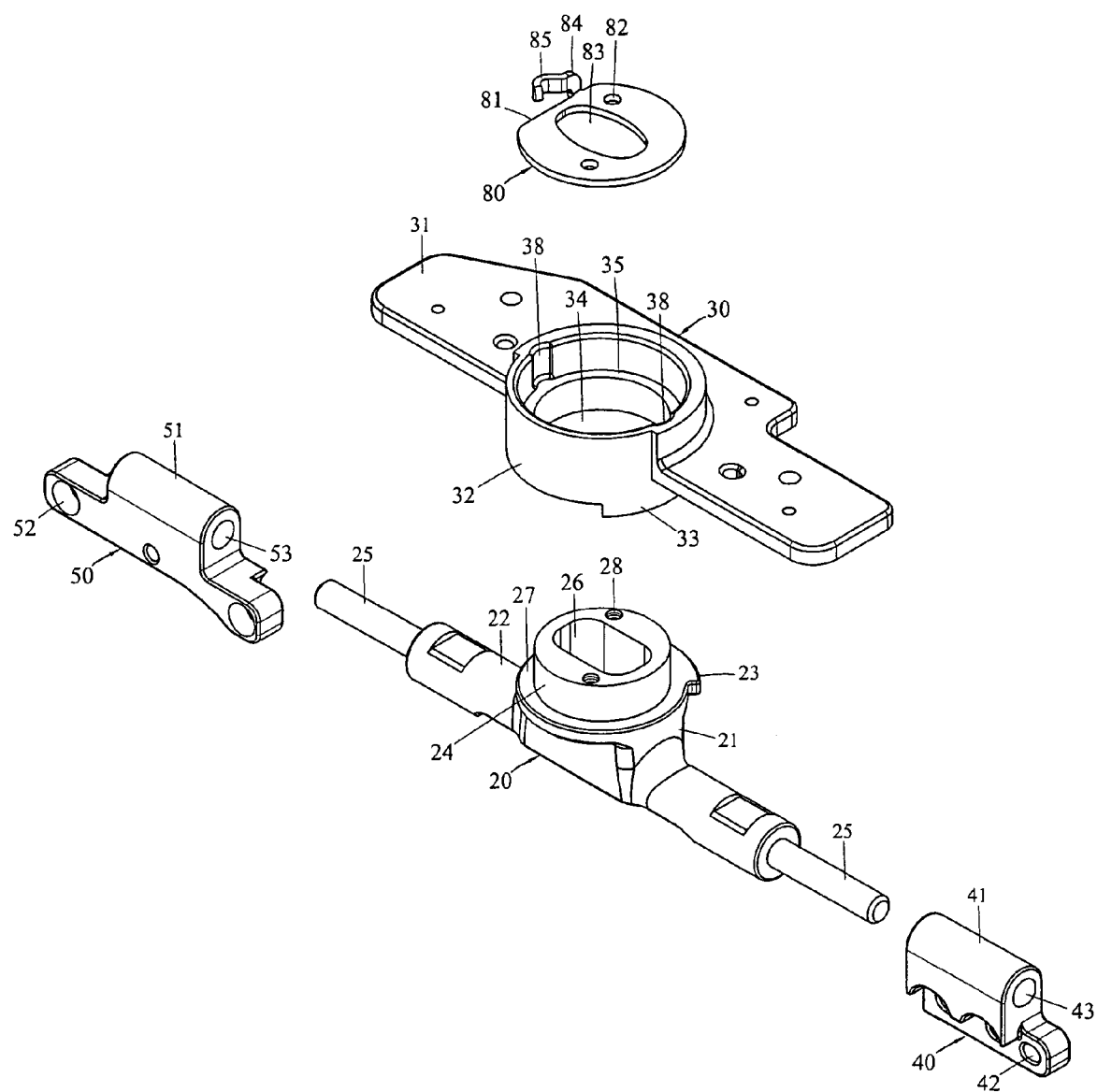

FIG. 11 is the disassembly drawing of the third example of the preferred embodiment of the pivotal hinge mechanism (10) as disclosed by the invention having touch sense function.

DETAILED DESCRIPTION OF THE PREFERRED EMBODIMENTS

Figure 1:
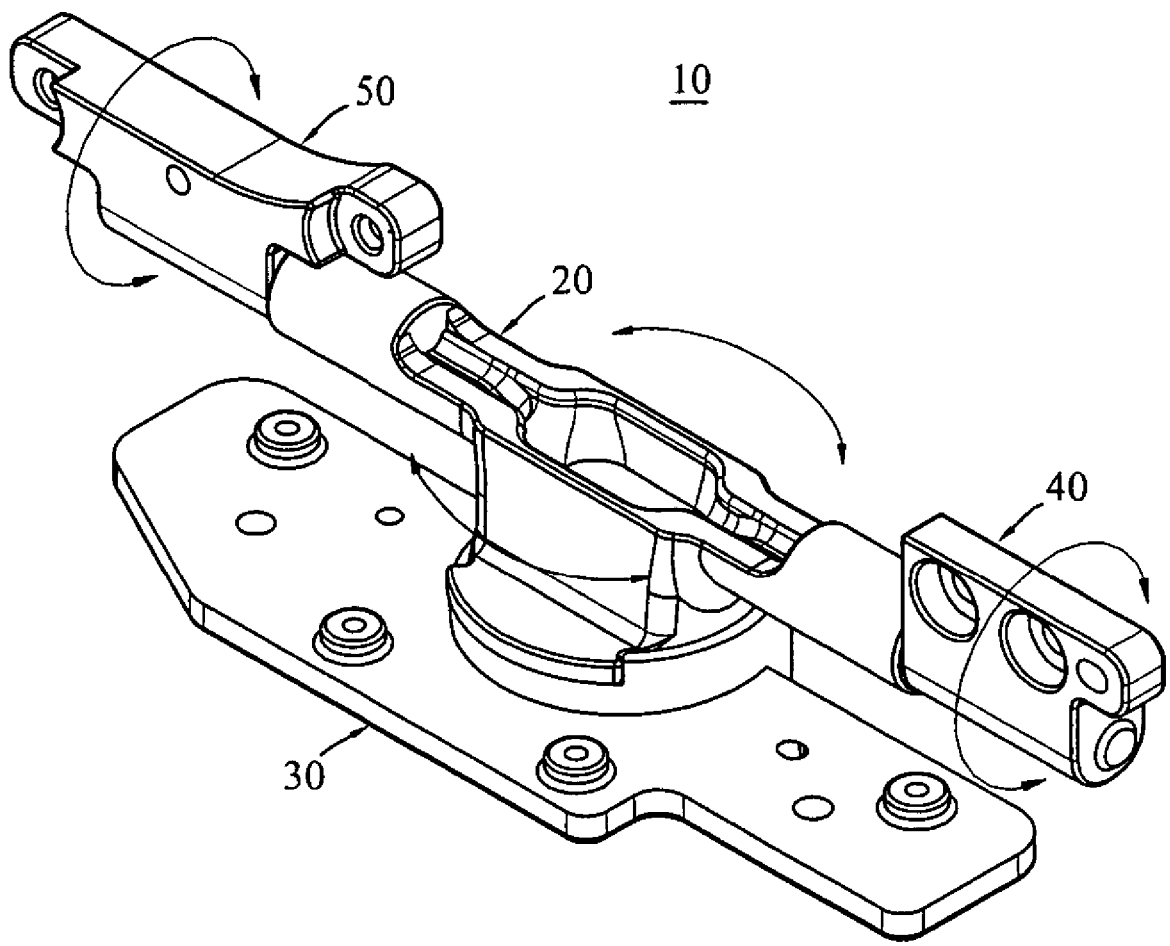
FIG. 1 is the three dimensional schematic drawing of the pivotal hinge mechanism (10) of the invention.
Figure 2:
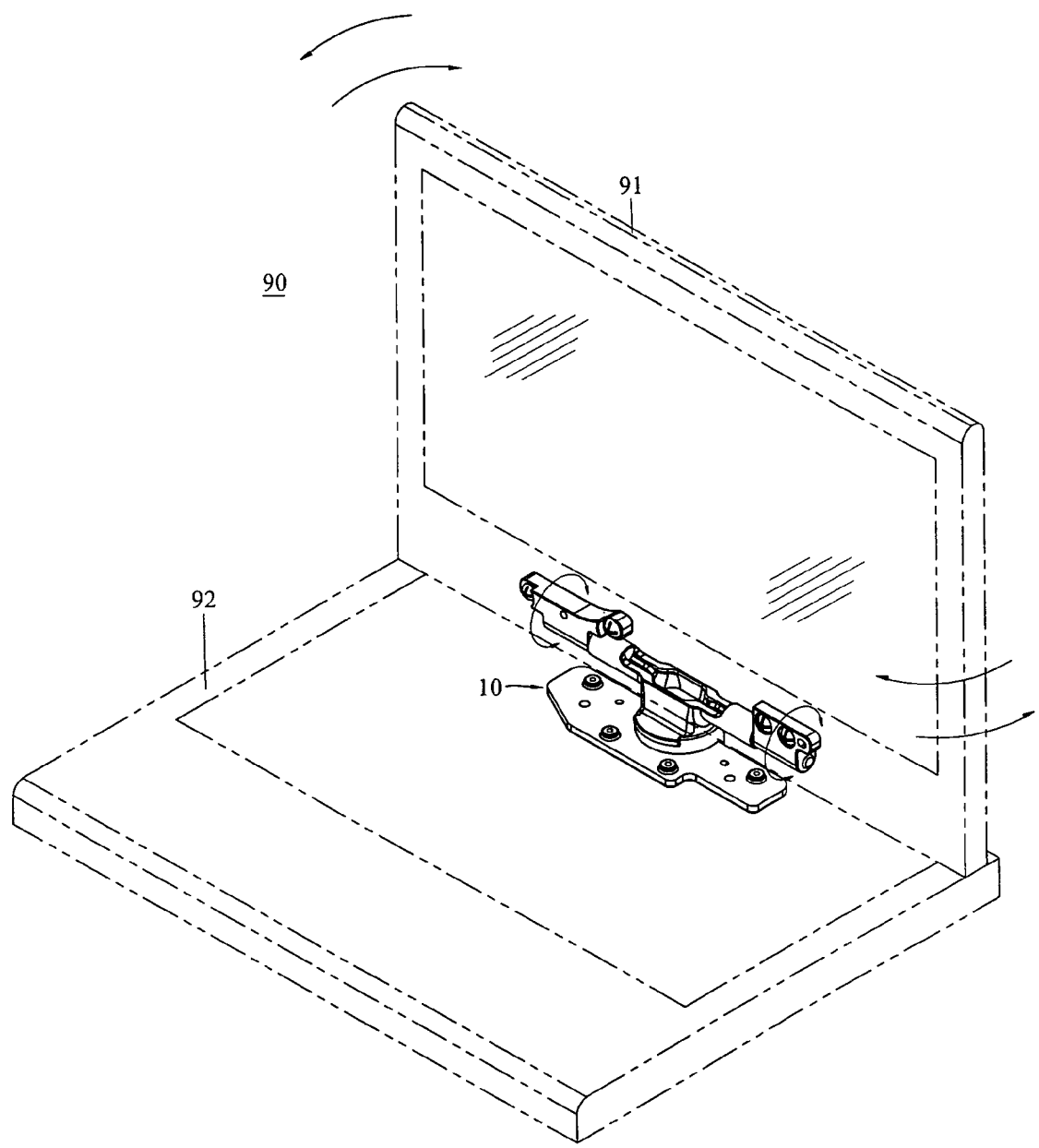
FIG. 2 is the application drawing of the pivotal hinge mechanism (10) of the invention applied on the electronic equipment such as Notebook PC (90).

Referring to FIG. 1 and FIG. 2, a pivotal hinge mechanism (10) disclosed on the present invention is capably applied on the electronic equipment such as Notebook PC (90) to enable the LCD (91) to possess a swivel axis, i.e. to enable the electronic equipment to have a swivel LCD (91); in other words, by applying the pivotal hinge mechanism (10) of the invention the LCD (91) of the electronic equipment (90) is able to perform, relative to the computer mainframe (92) of the electronic equipment (90), not only the function of opening-up and closing-down but also the function of rotation within an angle of 0~180° in clockwise or counter clockwise direction, particularly, when the LCD (91) is rotated an angle of 180°, and then is closed-down to the upper side of the computer mainframe (92), the screen of the LCD (91) shall face upwardly that enables the electronic equipment such as the Notebook PC to be transformed from Notebook PC mode to Tablet PC mode.

Referring to from FIG. 1 through FIG. 4, the pivotal hinge mechanism (10) comprises a swivel seat (20), a support seat (30), a first pivot mounting part (40), a second pivot mounting part (50) and a positioning plate (60) wherein the swivel seat (20) can rotate an angle of 0~180° relative to the support seat (30). Hence, as shown in FIG. 2, when the support seat (30) is fixed on the mainframe (92) of the electronic equipment (90), and the swivel seat (20) is fixed on the liquid crystal display (LCD) (91) of the electronic equipment (90) to form the swivel axis of the LCD (91), then the LCD (91) will have the function of rotating an angle of 0~180°.

Figure 3:
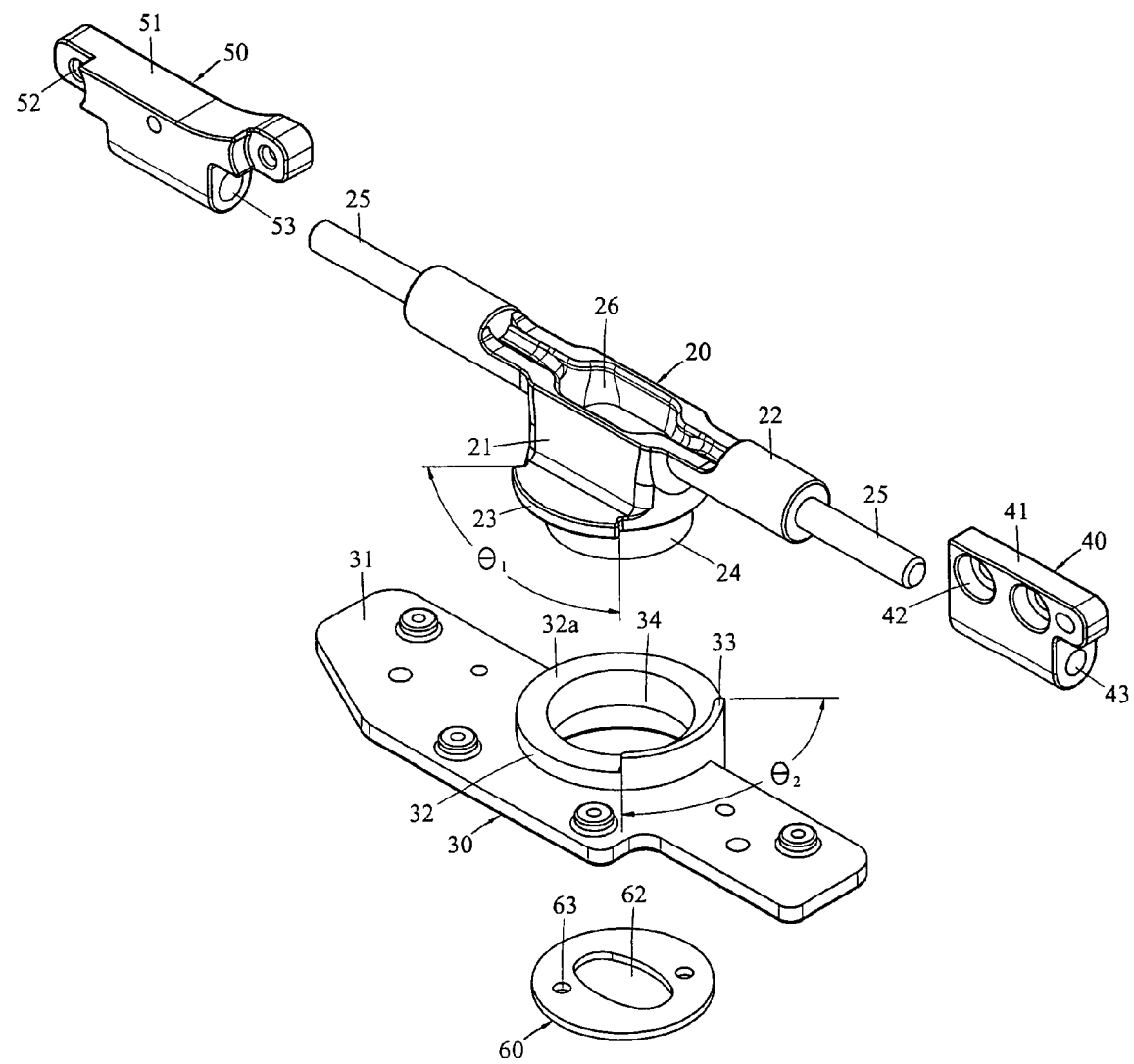
FIG. 3 is the disassembly drawing of the pivotal hinge mechanism (10) of the invention.
Figure 4:
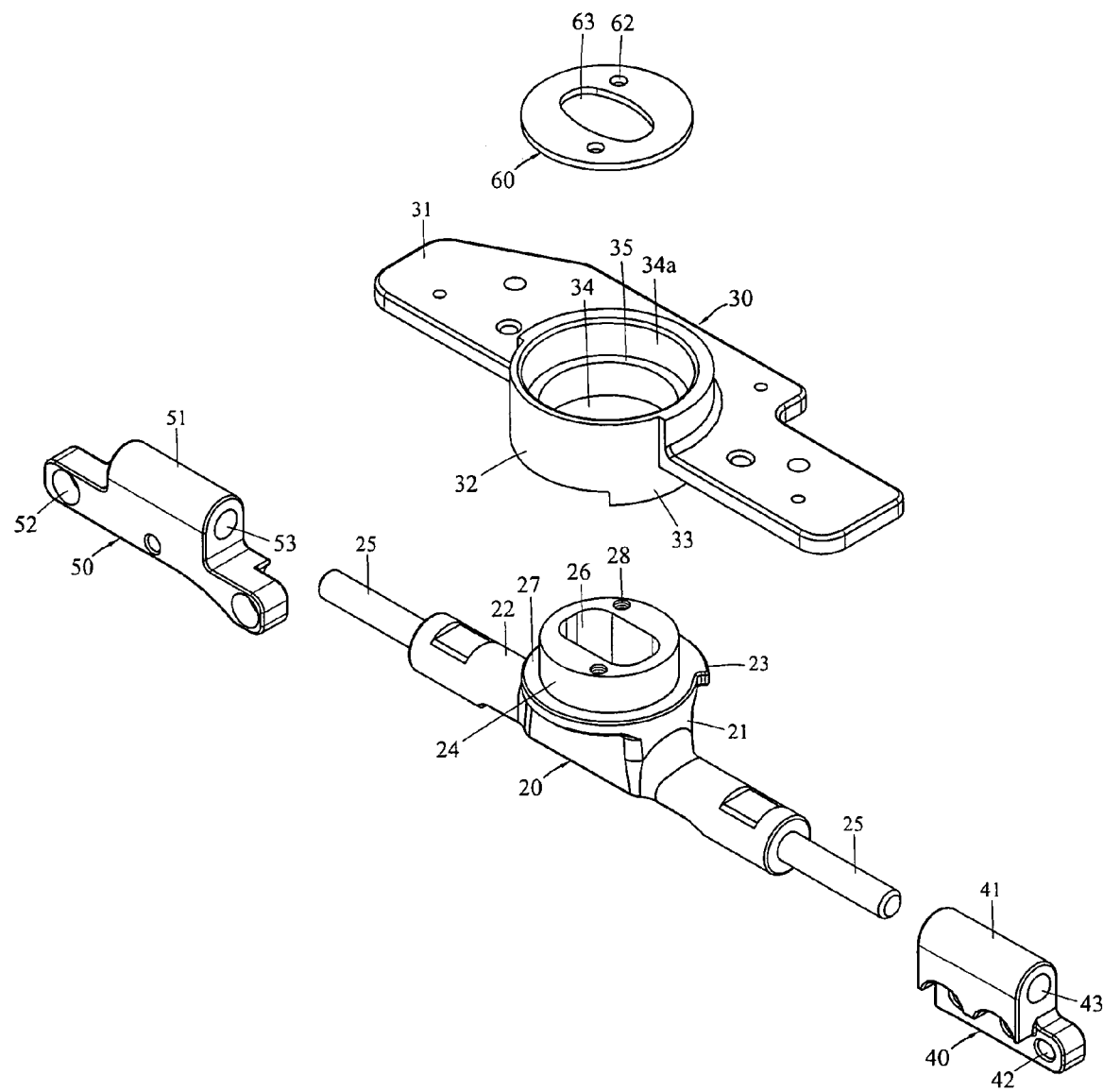
FIG. 4 is the disassembly drawing of the pivotal hinge mechanism (10) shown in FIG. 3 but under different angle of view.

Referring to FIG. 3 and FIG. 4, the swivel seat (20) has a base seat (21) to be formed as a main body for the swivel seat (20), and has a cylindrical neck shaft (24) which has a reduced inner hole extended downwardly from the lower side of the base seat (21). The juncture formed due to cylindrical neck shaft (24) connected with base seat (21) is designed to provide with a collar shoulder (27) to the neck shaft (24), and the collar shoulder (27) has a sector-shaped flange which is formed by in radial extended with respect to the center line of the neck shaft (24) through a radial angle of $\theta_1$ to be form as a first stopper shoulder (23). When the swivel seat (20) and the support seat (30) are assembled together to form a pivot joint, the first stopper shoulder (23) will functioned as a stopper to restrict the swivel seat (20) capably rotated within 0~180° relative to the support seat (30).

In addition, a connecting shaft (22) is extended with symmetrical structural shape from both sides of the base seat (21) on the upper portion with a pivot shaft (25) formed thereto for mounting the first pivot mounting part (40) and the second pivot mounting part (50) which can rotate about the center of the pivot shaft (25) of the connecting shaft (22) of the swivel seat (20) and relative to the swivel seat (20).

Hence, as shown in FIG. 2, when the first pivot part (40) and the second pivot part (50) are pivotally installed on the swivel seat (20), and also fixed on the LCD (91) of the electronic equipment (90), the swivel seat (20) can be structured as the swivel shaft of the LCD (91) of the electronic equipment (90) by which the LCD (91) of the electronic equipment (90) can also be lifted up and closed down to make rotating movement relative to the swivel seat (20); under this condition, when the cylindrical neck shaft (24) of the swivel seat (20) is installed on the support seat(30) of the computer mainframe (92) of the electronic equipment (90) to form pivot joint, the LCD (91) of the electronic equipment (90) may achieve the function of lifting up and closing down and rotating in clockwise or counter clockwise direction for an angle within 0~180°.

For connecting the swivel seat (20) and support seat (30) to form pivot joint, on the end surface of the cylindrical neck shaft (24) of the swivel seat (20) has several fastening tap holes (28) used to fasten a positioning plate (60) and then to have the swivel seat (20) and the support seat (30) always kept in pivot joint condition preventing from separation.

Beside, the swivel seat (20) has a wire passage (26) passing through the base seat (21) of the swivel seat (20) and the connecting shaft (22), so that the power wire and signal wire inside the computer mainframe (92) of the electronic equipment (90) can be connected to the LCD (91) of the electronic equipment (90) through the wire passage (26), and, when the LCD (91) is lifted up or closed down, or rotates in clock-wise or counter clockwise direction, the power wire and signal wire will not get entangled or be interfered.

Referring to FIG. 3 and FIG. 4, the support seat (30) has a plate shaped main body (31) which is designed for being fastened on the computer mainframe (92) of the electronic equipment (90), and a cylindrical hollow shaft (32) having a center hole (34) is formed on and extended symmetrically from the upper and lower side of the plate shaped main body (31). On the upper end (32a) of the cylindrical hollow shaft (32), a circular protruding lip is formed and which is circumferentially extended to a range of $\theta_2$ to form the second stopper shoulder (33).

In addition, on the lower end surface of the cylindrical hollow shaft (32) of the support seat (30), the inner wall of the center hole (34) is cut to some depth concentrically with respect to the center line of the center hole (34) to form an eye-shaped recession (34a) which provides a circular shoulder portion (35) for achieving the stopping function or effect.

Since the inner diameter of the center hole (34) of the cylindrical hollow shaft (32) is a little bit greater than the outer diameter of the neck shaft (24) of the aforesaid swivel seat (20), the neck shaft (24) may be installed into the center hole (34) of the support seat (30) to form a cylindrical pivot joint.

Referring to FIG. 1, FIG. 3 and FIG. 4, when the swivel seat (20) and the support seat (30) forms a pivot joint, the shoulder portion (27) of the base seat (21) of the swivel seat (20) is mounted on and supported by the upper end surface (32a) of the cylindrical hollow shaft (32) of the support seat (30), meanwhile the first stopper shoulder (23) of the swivel seat (20) and the second stopper shoulder (33) of the support seat (30) are in the same movement plane, and located adjacent to each other. With this arrangement the angular movement of the first stopper shoulder (23) of the swivel seat (20) will be limited by the second stopper shoulder (33) of the support seat (30) to be within a specific range.

Referring to FIG. 3 and FIG. 4, the first pivot mounting part (40) has two design purposes, one of purposes is pivotally mounted on the pivot shaft (25) of the swivel seat (20), and the other is fastened on the LCD (91) of the electronic equipment (90). Hence, a fastening holes (42) for mounting fixing screws and a pivot hole (43) for achieving pivot connection with pivot shaft (25) of the swivel seat (20) are provided on the main body (41) of the first pivot mounting part (40).

Since the second pivot mounting part (50) is designed with the same purpose as that of the first pivot mounting part (40), the main body (51) of the second pivot mounting part (50) therefore provides a fastening holes (52) for mounting the fastening screws and a pivot hole (53) for achieving pivot connection with the pivot shaft (25) of the swivel seat (20).

As shown in FIG. 3 and FIG. 4, the positioning plate (60) is an anti-abrasion member having two design purposes. One of purpose is that when the swivel seat (20) and the support seat (30) are assembled together to form pivot joint the positioning plate (60) is fastened on the end surface of the neck shaft (24) of the swivel seat (20), and is located in the eye-shaped recession (34a) and stopped by the circular shoulder (35) to achieve the purpose of preventing from separation of the swivel seat (20) and the support seat (30) and keeping them in pivot joint condition; and the other purpose is that the positioning plate (60) is also used for installing the damping plate (not shown in the drawing) which is located inside the eye-shaped recession (34a) of the cylindrical hollow shaft (32) of the support seat (30). When the swivel seat (20) is rotating relative to the support seat (30), the damping effect may help the user in locating the swivel seat on the desired position.

Therefore, the positioning plate (60) has fastening holes (63) for mounting fastening screws. Further, in order to achieve the purpose of allowing the power wire and signal wire of the computer mainframe (92) of the electronic equipment (90) to pass through the wire passage (26) of the swivel seat (20) and to be connected to the LCD (91) of the electronic equipment (90), the positioning plate (60) also provides holes (62) for said power wire and signal wire to pass through.

Further referring to from FIG. 5 to FIG. 7, the pivotal hinge mechanism (10) of the invention is designed to arrange the aforesaid $\theta_1$ and $\theta_2$ in such a way that the sum of $\theta_1$ and $\theta_2$ meets the condition of $\theta_1+\theta_2=180°$. Hence, when the first stopper shoulder (23) of the swivel seat (20) touches and is stopped by the second stopper shoulder (33) of the support seat (30) the sum of the max. angular movement of the first stopper shoulder (23) and the second stopper shoulder (33) equals 180°, and due to this arrangement, when the swivel seat (20) rotates in either direction, either end of the first stopper shoulder (23) will touch and be stopped by the respective end of the second stopper shoulder (33) so that the rotating angle of the swivel seat (20) is limited within the range of 0~180°.

Based on this, when an electronic equipment (90) is equipped with the pivotal hinge mechanism (10) of the invention the screen side of the LCD (91) (mentioned by the arrowhead) of the electronic equipment (90) may rotate through an angle of 0~180° relative to the computer mainframe (92) of the electronic equipment (90), and when the LCD (91) of the electronic equipment (90) is closed down on the computer mainframe (92), the screen side of the LCD (91) may face outwardly on the computer mainframe (92). This way enable the electronic equipment (90) to possess the function of allowing the LCD to rotate through an angle of 0~180° and transforming the electronic equipment (90) from Notebook PC to Tablet PC.

Besides, the pivotal hinge mechanism (10) disclosed by the invention may be further equipped with touch sense function to help the user to make sure that the swivel seat (20) has been in the specific angular position.

EXAMPLE OF EMBODIMENT

As shown from FIG. 8 to FIG. 11, there are three embodiments of the pivotal hinge mechanism (10) of the invention possessing the touch sense function, but, as distinctly understood, the invention is not to limit these three examples of embodiment whose purpose is for illustrative purpose only. Therefore, any design presenting the same, or effecting the equivalent spirit or inventive concepts of the invention in the broader aspects or any simple change, modification, improvement or variation of the invention are already covered by the appended claims.

The first embodiment of pivotal hinge mechanism (10) of the present invention is shown as in FIG. 8 which includes a raised portion (36) on the flat shaped main body (31) joining to the cylindrical hollow shaft (32). The purpose of having the raised portion (36) on the flat shaped main body (31) is for mounting a set of touch sense unit (37) to enable the pivotal hinge mechanism (10) of the present invention to possess the function of touch sense.

The touch sense unit (37) generally has a passage (36a) penetrating the raised portion (36) and the wall of the cylindrical hallow shaft (32) in radial direction from outer surface toward the center of the cylindrical hallow shaft (32), and comprises a sliding part, an elastic part and a fastening part, wherein the sliding part and the elastic part are installed in the passage (36a) of the raised portion (36) which are sealed by the fastening part from the outer end of the passage (36a) of the raised portion (36) so that the sliding part and the elastic part form a sliding unit inside the passage (36a).

One of the preferred embodiments of the touch sense unit (37) is shown as in FIG. 8 which comprises a ball (37a), a spring (37b), and a fastening screw (37c). The procedure of installing the touch sense unit (37) into the raised portion (36) of the support seat (30) is in such an order that the ball (37a) shall be placed in the passage (36a) at first, and then place the spring (37b) in the passage (36a), then install the fastening screw (37c) on the outer end of the passage (36a) to complete the installation procedure. However, more preferably, the passage (36a) shall be in cone shape with the diameter of the opening of the outer end a little bit greater than the diameter of ball (37a), and the diameter of the opening of the inner end a little bit smaller than the diameter of ball (37a). With this arrangement the ball (37a) will not fall off from the opening of the inner end of the passage (36a) after the ball (37a) and the spring (37b) are installed inside the passage (36a).

When the ball (37a) is pushed by the spring (37b), the ball (37a) will protrude out of the opening of the passage (36a) and into the center hole (34) of the cylindrical hallow shaft (32) to enable the function similar to that of a snap catch. When the protruded portion of the ball (37a) inside the center hole (34) of the cylindrical hallow shaft (32) is under pressure, the ball (37a) will be pushed back to the passage (36a), and when the pressure on the ball (37a) is released, the ball (37a) will again protrude into the center hole (34).

While the touch sense unit (37) installed in the raise portion (36) of the support seat (30) is employed, a matching groove (29) shall be provided on the inner surface of the neck shaft (24) in-axial direction located at the specific angular position. And, while the swivel seat (20) rotates on and relative to the support seat (30), the sound and touch sense produced by the touch sense unit (37), when the ball (37a) slides into the matching groove (37b) on the swivel seat (20) may help the user to make sure that the swivel seat (20) of the pivotal hinge mechanism (10) has reached the specific angular position such as 0°, 45°, 90° or 180° etc..

The second embodiment of pivotal hinge mechanism (10) possessing the touch sense function is shown as in FIG. 9 and FIG. 10 which employs a positioning plate (70) to achieve the touch sense function.

Since the position plate (70) still has the same basic function as that of the aforesaid position plate (60), it also has a wire passage (72) for the power wire and signal wire to pass through, and a fastening hole (75) for mounting the fastening screw. In addition, a curved cut (74) is formed on the positioning plate (70) to form a curved spring arm (75) which acts as a spring, and has a small protrusion formed on the end portion of the spring arm (75) as sliding end (76) which will move back when acted by pressure, and will restore to its original position when the pressure acted on it is released.

When the aforesaid positioning plate (70) is employed, a matching groove (38) formed at specific radial angular position shall be provided on the inner circumferential surface of the eye-shaped recession (34a) of cylindrical hallow shaft (32) of the support seat (30). Therefore, when the swivel seat (20) rotates on and relative to the support seat (30), the sound and touch sense produced by the touch sense unit may help the user to make sure that the swivel seat (20) of the pivotal hinge mechanism (10) has reached the specific angular position such as 0°, 45°, 90° or 180° etc.

The third embodiment of the pivotal hinge mechanism (10) of the present invention is shown as in FIG. 11 which employs a positioning plate (80) of specific shape following the similar principle of the aforesaid positioning plate (60) to achieve the effect of touch sense.

The positioning plate (80) also has the same basic function as that of the aforesaid positioning plate (60) having the wire passage (82) for the power wire and signal wire to pass through and the fastening hole (83) for mounting the fastening screw. And, a connecting arm (84) is formed on and extended from the cutting edge (81) formed along the outer edge of the positioning plate (80). Further, a touch-sensing spring piece (85) which acts elastically as a spring, and move backwardly to the cutting edge (81) of the positioning plate (80) when acted by pressure, and will restore to its original position when the pressure acted on the touch-sensing spring piece (85) is released.

When the specific positioning plate (80) is employed, a matching groove (38) formed at specific radial angular position shall be provided on the inner circumferential surface of the eye-shaped recession (34a) of the cylindrical hollow shaft (32) of the support seat (30). Therefore, when the swivel seat (20) rotates on and relative to the support seat (30), the sound and touch sense produced by the touch sense unit may help the user to make sure that the swivel seat (20) of the pivotal hinge mechanism (10) has reached the specific angular position such as 0°, 45°, 90°, or 180° etc.

What is claimed is:

1. A pivotal hinge mechanism for a mobile computer comprising a swivel seat, a support seat, a first pivot mounting part, a second pivot mounting part and a positioning plate, and the swivel seat is supported to rotate on the support seat and relative to the support seat through an angle of 0 to 180 degrees; wherein:

the swivel seat has a main body having a bottom side that forms a neck shaft with a reduced inner hole, a top side that forms a connecting shaft extended from the top side in left and right directions, and a circumferential edge on said bottom side that forms a first stopper shoulder arranged in curved shape about the center line of said neck shaft and angularly extending through a range of $\theta_1$ degrees;

the support seat has a plate shaped main body that has a cylindrical hollow shaft forming a pivot joint with the neck shaft of said swivel seat; said cylindrical hollow shaft forms an eye-shaped recession on the bottom side for forming a circular shoulder inside, and forms a second stopper shoulder formed on the upper end of said cylindrical hollow shaft along the circumferential edge angularly extending through a range of $\theta_2$ degrees about the center line of said cylindrical hollow shaft, and arranged to satisfy the condition whereby the sum of $\theta_1+\theta_2$ is equal to 180 degrees;

the first pivot mounting part and the second pivot mounting part respectively have a pivot mounting hole through which said first pivot mounting part and said second pivot mounting part are mounted on separate connecting shafts of said swivel seat to form pivot connection; and the positioning plate is fastened on the end of the neck shaft of said swivel seat, and installed inside the eye-shaped recession of the cylindrical hollow shaft of said support seat.

2. The pivotal hinge mechanism for a mobile computer as defined in claim 1, wherein the main body of said support seat has a raised portion and a set of touch sense units are installed therein, and the inner circumferential surface of the neck shaft of said swivel seat is provided with a matching groove.

3. The pivotal hinge mechanism for a mobile computer as defined in claim 2, wherein said touch sense units comprise a sliding part, an elastic part and a fastening part.

4. The pivotal hinge mechanism for a mobile computer as defined in claim 3, wherein said touch sense units comprise a ball, a spring and a fastening screw.

5. The pivotal hinge mechanism for a mobile computer as defined in claim 4, wherein a damping plate is installed in between the circular shoulder formed inside the cylindrical hollow shaft of said support seat and said positioning plate.

6. The pivotal hinge mechanism for a mobile computer as defined in claim 4, wherein said swivel seat provides a wire passage penetrated through the neck shaft and the connecting shaft of said swivel seat.

7. The pivotal hinge mechanism for a mobile computer as defined in claim 3, wherein a damping plate is installed in between the circular shoulder formed inside the cylindrical hollow shaft of said support seat and said positioning plate.

8. The pivotal hinge mechanism for a mobile computer as defined in claim 7, wherein said swivel seat provides a wire passage penetrated through the neck shaft and the connecting shaft of said swivel seat.

9. The pivotal hinge mechanism for a mobile computer as defined in claim 3, wherein said swivel seat provides a wire passage penetrated through the neck shaft and the connecting shaft of said swivel seat.

10. The pivotal hinge mechanism for a mobile computer as defined in claim 2, wherein a damping plate is installed in between the circular shoulder formed inside the cylindrical hollow shaft of said support seat and said positioning plate.

11. The pivotal hinge mechanism for a mobile computer as defined in claim 2, wherein said swivel seat provides a wire passage penetrated through the neck shaft and the connecting shaft of said swivel seat.

12. The pivotal hinge mechanism for a mobile computer as defined in claim 1, wherein said positioning plate has a curved cut and a curved spring arm, and on the inner circumferential surface of the eye-shaped recession formed inside the cylindrical hollow shaft of said support seat is provided with a matching groove.

13. The pivotal hinge mechanism for a mobile computer as defined in claim 12, wherein a damping plate is installed in between the circular shoulder formed inside the cylindrical hollow shaft of said support seat and said positioning plate.

14. The pivotal hinge mechanism for a mobile computer as defined in claim 12, wherein said swivel seat provides a wire passage penetrated through the neck shaft and the connecting shaft of said swivel seat.

15. The pivotal hinge mechanism for a mobile computer as defined in claim 1, wherein the said positioning plate has a cut edge, a connecting arm extended from the cut edge, and a touch-sensing spring piece extended outwardly from the end of the connecting arm, and on the inner circumferential surface of the eye-shaped recession formed inside the cylindrical hollow shaft of said support seat is provided with a matching groove.

16. The pivotal hinge mechanism for a mobile computer as defined in claim 15, wherein a damping plate is installed in between the circular shoulder formed inside the cylindrical hollow shaft of said support seat and said positioning plate.

17. The pivotal hinge mechanism for a mobile computer as defined in claim 15, wherein said swivel seat provides a wire passage penetrated through the neck shaft and the connecting shaft of said swivel seat.

18. The pivotal hinge mechanism for a mobile computer as defined in claim 1, wherein a damping plate is installed in between the circular shoulder formed inside the cylindrical hollow shaft of said support seat and said positioning plate.

19. The pivotal hinge mechanism for a mobile computer as defined in claim 18, wherein said swivel seat provides a wire passage penetrated through the neck shaft and the connecting shaft of said swivel seat.

20. The pivotal hinge mechanism for a mobile computer as defined in claim 1, wherein said swivel seat provides a wire passage penetrated through the neck shaft and the connecting shaft of said swivel seat.

* * * * *